US010337558B2

(12) United States Patent
Beaurepaire et al.

(10) Patent No.: US 10,337,558 B2
(45) Date of Patent: Jul. 2, 2019

(54) SLIDING COMPONENT AND METHOD

(71) Applicants: Mahle International GmbH, Stuttgart (DE); Mahle Engine Systems UK Limited, Rugby (GB); Mahle Composants Moteur France SAS, Chavanod (FR)

(72) Inventors: Oliver Beaurepaire, Rumilly (FR); Kayleigh McEwan, Coalville (GB)

(73) Assignees: MAHLE INTERNATIONAL GMBH (DE); MAHLE ENGINE SYSTEMS UK LTD (GB); MAHLE COMPOSANTS MOTEUR FRANCE SAS (FR)

( * ) Notice: Subject to any disclaimer, the term of this patent is extended or adjusted under 35 U.S.C. 154(b) by 0 days.

(21) Appl. No.: 15/680,878

(22) Filed: Aug. 18, 2017

(65) Prior Publication Data

US 2018/0051749 A1 Feb. 22, 2018

(30) Foreign Application Priority Data

Aug. 19, 2016 (GB) .................................. 1614192.1

(51) Int. Cl.
*F16C 9/02* (2006.01)
*F16C 33/12* (2006.01)
(Continued)

(52) U.S. Cl.
CPC .............. *F16C 33/124* (2013.01); *F16C 9/02* (2013.01); *F16C 33/046* (2013.01);
(Continued)

(58) Field of Classification Search
CPC .. F16C 9/02; F16C 9/04; F16C 33/046; F16C 33/1241; F16C 33/125; F16C 33/127;
(Continued)

(56) References Cited

U.S. PATENT DOCUMENTS

| 5,700,093 A | 12/1997 | Hiramatsu et al. |
| 8,430,571 B2 * | 4/2013 | Bickle .................. F16C 33/201 |
| | | 384/430 |

(Continued)

FOREIGN PATENT DOCUMENTS

| DE | 102013202123 B3 * | 5/2014 | ............ F16C 33/121 |
| DE | 11 2015 002 269 T5 | 2/2017 | |

(Continued)

OTHER PUBLICATIONS

"Titanium Dioxide—Titania (TiO2)", XP-002776348, www.azom. com/properties.aspx?ArticleID=1179, retrieved on Dec. 4, 2017.

(Continued)

*Primary Examiner* — Phillip A Johnson
(74) *Attorney, Agent, or Firm* — Fishman Stewart PLLC

(57) ABSTRACT

A sliding component may include an overlay comprising a polymeric material and a metal oxide. The metal oxide may have a thermal conductivity of greater than about 1.5 $Wm^{-1}K^{-1}$, and a Mohs hardness of between about 5 and about 7. The sliding component may be a sliding component for an engine, such as a bearing, a bearing shell, a bush, a thrust washer, a journal bearing or the like.

18 Claims, 2 Drawing Sheets

(51) Int. Cl.
*F16C 33/20* (2006.01)
*F16C 33/04* (2006.01)

(52) U.S. Cl.
CPC .......... *F16C 33/125* (2013.01); *F16C 33/201* (2013.01); *F16C 2202/04* (2013.01); *F16C 2202/32* (2013.01); *F16C 2204/00* (2013.01); *F16C 2206/42* (2013.01); *F16C 2208/42* (2013.01)

(58) Field of Classification Search
CPC .... F16C 33/201; F16C 33/203; F16C 33/205; F16C 33/206; F16C 33/208; F16C 2204/32; F16C 2206/42; F16C 2208/42
See application file for complete search history.

(56) References Cited

U.S. PATENT DOCUMENTS

| | | | |
|---|---|---|---|
| 2003/0235355 A1* | 12/2003 | Hiramatsu | F16C 33/201 384/276 |
| 2004/0115477 A1* | 6/2004 | Nesbitt | A47J 36/025 428/692.1 |
| 2008/0247687 A1 | 10/2008 | Stecher | |
| 2008/0248269 A1 | 10/2008 | Shibuya et al. | |
| 2009/0305916 A1 | 12/2009 | Mergen | |
| 2010/0177995 A1* | 7/2010 | Takayanagi | C10M 103/00 384/13 |
| 2010/0261625 A1* | 10/2010 | Hakamata | B82Y 30/00 508/103 |
| 2011/0268944 A1 | 11/2011 | Adam et al. | |
| 2012/0008887 A1* | 1/2012 | Adam | B32B 15/08 384/42 |
| 2012/0184471 A1* | 7/2012 | Windrich | C09D 5/00 508/113 |
| 2016/0123381 A1 | 5/2016 | Ovares et al. | |
| 2017/0081522 A1* | 3/2017 | Adam | C09D 5/00 |
| 2017/0088791 A1* | 3/2017 | Kobayakawa | C10M 169/04 |

FOREIGN PATENT DOCUMENTS

| | | |
|---|---|---|
| EP | 0984182 A1 | 3/2000 |
| EP | 2940327 A1 | 11/2015 |
| EP | 2957784 A1 | 12/2015 |
| JP | 2005-201289 A | 7/2005 |
| WO | WO-2010076306 A1 | 7/2010 |

OTHER PUBLICATIONS

"Titanium Dioxide Powder (Rutile Grade) (TiO2)", XP-002776349, www.reade.com/products/titanium-dioxide-powder-rutile-grade-tio2, retrieved on Dec. 4, 2017.
European Search Report dated Jan. 22, 2018 related to corresponding European Patent Application No. 17186168.5.
English abstract for JP-2005-201289.
EP Office Action dated Sep. 17, 2018 for EP-17 186 168.5.

* cited by examiner

US 10,337,558 B2

SLIDING COMPONENT AND METHOD

CROSS-REFERENCE TO RELATED APPLICATION(S)

This application claims priority to United Kingdom patent application GB 1614192.1 filed on Aug. 19, 2016, the contents of which are hereby incorporated by reference in its entirety.

TECHNICAL FIELD

The invention relates to a sliding component and a method for making a sliding component. In particular, the invention relates to an overlay of a sliding component and a method for forming the overlay. The sliding component may be a sliding component for an engine, such as a bearing, a bearing shell, a bush, a thrust washer, a journal bearing or the like.

BACKGROUND

In an internal combustion engine, each main-bearing assembly typically comprises a pair of half bearings retaining a cylindrical journal of a crankshaft. Each half bearing comprises a semi-cylindrical bearing shell. The bearing shells typically have a layered construction in order to provide the required mechanical performance. A strong backing material provides structural strength, and is coated with one or more layers having preferred tribological properties to provide a bearing surface that faces and supports the cooperating crankshaft journal. The backing is usually of steel, of thickness 1 mm or more, and is coated with or bonded to a lining layer (which may comprise more than one individual layer), and an overlay which faces the crankshaft journal.

The function of the overlay is to provide a relatively soft, conformable layer that can accommodate any small misalignments between the harder steel crankshaft journal and the bearing shells, and receive and embed dirt particles that may circulate in the oil supply and enter the bearing, so as to prevent damage to or scoring of the journal. These functions of the overlay are respectively termed conformability and embeddability.

These functions require the overlay to be relatively soft and deformable, but at the same time sufficiently robust to provide a bearing surface having a long lifetime, without cracking due to overloading or fatigue and without unacceptable wear.

The overlay is made from an overlay material, which may be a metal layer, comprising, for example, lead, tin, bismuth, silver, copper alloys or aluminium alloys. The overlay may be applied to a substrate by galvanic processes, sputtering or electroplating. Alternatively, the overlay material may be a non-metal material comprising an artificial resin base, or matrix, and an additive for enhancing the load carrying capacity and/or wear resistance of the sliding component.

It is generally known that wear of the overlay material can lead to exposure of the lining layer to which the overlay material is applied. This can lead to failure of the sliding component due to seizure.

Trends in modern high speed diesel engines towards higher power outputs with downsized engine systems has further led to increased peak cylinder pressures, higher torques and higher temperatures. These factors mean that bearing materials, the upper con-rod and lower main bearing in particular, are required to perform under increased loads with a reduction in oil film thickness and viscosity.

A particular challenge to the performance of overlays has arisen in recent years from the fuel-saving configuration of modern vehicle engines to "stop-start" operation. Although engine bearings are conventionally hydrodynamically lubricated during use, little or no lubrication may be provided to the bearings when an engine starts. Accordingly, stop-start operation of an engine places increased demands upon the performance of the bearings, and in particular the performance of overlays.

Research in the field of sliding components has resulted in the use of a wide range of compositions of overlay materials, some incorporating relatively harder particles, particularly where the bulk of the overlay material is an artificial resin base or matrix, with the intention of providing the sliding component with enhanced wear resistance. There has been some interest in the use of iron oxides in overlay materials, for example in the following prior art.

Published international patent application number WO2010076306 in the name of Federal-Mogul Wiesbaden GmbH describes a sliding element having a substrate and a sliding layer material applied to the substrate. The sliding layer material comprises at least one cross-linkable binder or at least one high-melting thermoplastic material or is of a material that contains a matrix of at least one high-melting thermoplast material or at least one "Duroplast" material. The sliding layer material contains $Fe_2O_3$ with a preferred volume percentage fraction of 0.1 to 15 vol. %.

Federal-Mogul Wiesbaden GmbH sells crankshaft bearings and conrods under the trade name "IROX"® which comprise a substrate and an overlay consisting of polyamide imide (PAI) and $Fe_2O_3$ particles.

Although attempts have thus been made to improve the performance of overlays for sliding components, there is still a significant demand for improved overlay performance.

SUMMARY

The invention provides a sliding component and a method for forming an overlay of a sliding component as defined in the appended independent claim(s), to which reference should now be made. Preferred or advantageous features of the invention are set out in dependent subclaims.

In a first aspect, the invention may thus provide a sliding component comprising an overlay. The overlay advantageously comprises a polymeric material and a metal oxide, wherein the metal oxide has a thermal conductivity of greater than about 1.5 $Wm^{-1}K^{-1}$, and a Mohs hardness of between about 5 and about 7.

By using a polymeric material, the present invention provides a sliding component which may advantageously have the anti-friction properties of known polymer overlays. The presence of metal oxides having a thermal conductivity of greater than 1.5 $Wm^{-1}K^{-1}$, and a Mohs hardness of between about 5 and about 7, may advantageously provide a wear-suppressing effect that significantly reduces wear on sliding components, while exhibiting excellent fatigue resistance. The inventors have found that a sliding component comprising an overlay according to the present invention may exhibit up to 90% wear reduction compared to a conventional polymer overlays.

Sliding components embodying the invention may be particularly suitable for use in fluid-lubricated applications. Particularly advantageous applications for the sliding components are as sliding bearings in combustion engines, for example crankshaft and/or camshaft bearings, big end bearings and small end bushings. Sliding components embodying the invention are particularly suitable for use in vehicle engines, including those equipped with stop-start engine technology in which the engine is subjected to a substantially greater number of starts over the life of the engine than in conventional engines and in which the crankshaft is regularly accelerated from rest before a uniform hydrodynamic film of lubricant is established on the bearing/running surface.

Sliding components embodying the invention may also be used to form any of a number of sliding surfaces on engine components including bushes, piston skirts, piston rings, liners, camshafts and connnecting rods. They may also be used as, or as part of, components such as thrust washers, flanges and half liners. Other suitable applications are envisaged and will be readily apparent to the skilled person.

A sliding component embodying the present invention may advantageously provide high load carrying capacity and enhanced wear resistance making it suitable for applications involving high temperatures and movement or rotation of components at high speeds, among others.

Preferably the overlay may comprise a metal oxide having a higher thermal conductivity of at least 15 $Wm^{-1}K^{-1}$, or at least 20 $Wm^{-1}K^{-1}$, or at least 30 $Wm^{-1}K^{-1}$.

Use of metal oxides having thermal conductivity greater than 1.5 $Wm^{-1}K^{-1}$ may advantageously increase the thermal conductivity of the overlay. In high speed applications involving high temperatures, this may allow the overlay to dissipate heat away from its surface as quickly as possible, so as to reduce the likelihood of seizure due to overheating. This may provide an advantage over prior art overlays, particularly those comprising iron oxide, $Fe_2O_3$, which has a low thermal conductivity of only 0.37 $Wm^{-1}K^{-1}$.

In an alternative aspect of the invention, the overlay may comprise a metal oxide having a somewhat lower thermal conductivity of at least 0.5 $Wm^{-1}K^{-1}$, or preferably at least 2 $Wm^{-1}K^{-1}$, although the performance of the overlay at high operating temperatures may be lower than in the first aspect of the invention described above.

The overlay may comprise a metal oxide with a Mohs hardness of greater than 3, or 4, or 5 and/or less than 6, or 7, or 8, preferably between 5 and 7. The inventors have found that metal oxides with a Mohs hardness greater than about 8, such as $Al_2O_3$ which has a Mohs hardness of 9, are undesirably abrasive for use in an overlay for sliding applications. The presence of these oxides in an overlay may lead to increased wear of the sliding component or a cooperating component. Particles with Mohs hardness greater than about 8 may also disadvantageously form initiation points for fatigue cracks in the overlay, reducing the fatigue resistance of the overlay. Metal oxides with a Mohs hardness lower than about 3, or 4, or 4.5, on the other hand, may be insufficiently hard to produce the desired wear reduction in the overlay, depending on the load applied to the overlay during use. The inventors have found that metal oxides with Mohs hardness between about 5 and about 7 provide the best wear reduction while maintaining high fatigue resistance.

The metal oxide used in the overlay may advantageously comprise one or more of cerium oxide, tin oxide, titanium dioxide, or zirconium dioxide. Preferably, the metal oxide may be one or more of $CeO_2$, $SnO$, $SnO_2$, $TiO_2$, or $ZrO_2$.

Particularly preferably the use of cerium oxide, or $CeO_2$, in the overlay may allow a user to monitor overlay wear by measurement of the cerium accumulating in the oil of an engine. Unlike iron or other metals, cerium oxide is unlikely to be used elsewhere in the engine system. Therefore, cerium in the oil could only originate from wear of the overlay. The presence of cerium oxide in the overlay may therefore advantageously be used to gauge bearing wear without the need for visual checks and an engine rebuild.

The use of cerium oxide in the overlay may provide the further advantage of improving the wettability of the sliding component with respect to lubricating oils, due to the high surface energy of the cerium oxide particles. In addition, the catalytic properties of $CeO2$ may help to prevent soot depositions or other carbon based build-up in an internal combustion engine.

The sliding component preferably comprises a backing, or substrate, usually formed from steel, of thickness 1 mm or more, which may be coated with or bonded to a lining layer (which may comprise more than one individual layer), and an overlay. The lining layer typically comprises a copper-based material (e.g. copper-tin bronze) or an aluminium-based material (such as aluminium or an aluminium-tin alloy) adhered to the backing either directly or through an intermediate layer, and is of thickness from about 0.05 to 0.5 mm. The overlay may be separated from the lining layer by a diffusion barrier in the form of an interlayer, for example of nickel. The overlay is preferably coated onto the lining layer (or the interlayer, if present) in one or more layers. Preferably, the overlay is applied in at least three layers in order to provide good thickness control and uniform thickness of the overlay over the surface of the substrate.

Preferably, the sliding component substrate comprises an iron, aluminium or copper alloy such as bronze or brass. These sliding component substrate materials may provide good running surfaces in an emergency situation so that, for example, if the overlay were to wear away rapidly, the sliding component may not seize immediately.

The overlay may comprise the metal oxide in particulate or powder form. In this case, the overlay preferably comprises metal oxide particles having an average particle size (or d50) of between 0.5 μm and 10 μm. Particularly preferably, the overlay comprises metal oxide particles having an average particle size (or d50) of greater than 0.5 μm or 1 μm or 2 μm, and/or less than 3 μm or 4 μm or 5 μm or 6 μm.

The inventors have found that spherical metal oxide particles, are particularly preferred because they may be more effective than other particle shapes in introducing less stress into the polymer matrix during use, thus avoiding introducing initiation points for fatigue cracking of the polymer matrix.

The overlay preferably comprises a dispersant, which may be a polymeric dispersant, particularly when the overlay comprises metal oxide particles having an average particle size (or d50) of less than 2 μm.

The overlay may alternatively comprise metal oxide in non-spherical form, such as in laminar or plate form, or flaked form. In this case, the overlay preferably comprises metal oxide particles having an average aspect ratio of between 1:2 and 1:4, such as about 1:3.

In each case, the maximum metal oxide particle dimension measured parallel to the overlay thickness should be less than 14 μm, or 10 μm, or 5 μm, or 3 μm, or less than the thickness of the layer of overlay in which the material is deposited, and the minimum metal oxide particle dimension may advantageously be greater than 0.1 μm, or 0.5 μm or 1 μm.

Preferably, the overlay comprises between about 0.5 wt % and about 8 wt % metal oxide. Particularly preferably, the overlay comprises about 4 wt % metal oxide. Below 0.5 wt %, the inventors have found the wear reduction provided by the metal oxide decreases substantially, while between 0.5 wt % and about 8 wt % metal oxide content provides substantial wear reduction without compromising the fatigue resistance of the sliding component. More than 8 wt % may disadvantageously reduce the integrity of the polymer matrix and so reduce its strength.

It is possible for the overlay composition to vary throughout its thickness. For example if the overlay is deposited in three layers as described above, each layer may have a different composition. In such a case the desired wt % of the metal oxide may be as measured in one layer of the multilayered overlay, or may be an average value as measured in the overlay in its entirety.

Preferably, the total thickness of the overlay is between 3 μm and 14 μm. More preferably, the total thickness of the overlay is between 8 μm and 10 μm.

Preferably, the polymeric material comprises polyamide imide (PAI). Other suitable polymer bases include: polyimides; polyamides; epoxy; epoxy resins; phenolic or polybenzimidazole (PBI); or a combination of any of these materials. Such polymeric materials may advantageously provide high temperature, wear and chemical resistance.

In a preferred embodiment of the present invention, the overlay may be formed from polyamide imide (PAI) polymeric material in which particles of cerium oxide, $CeO_2$, are dispersed. Cerium oxide has a thermal conductivity of 12 $Wm^{-1}1K^{-1}$ and a Mohs hardness of 6. The overlay has a thickness of approximately 10 μm, and comprises 4 wt % of spherical cerium oxide particles with an average particle size (d50) of 2 μm.

An overlay embodying the present invention may comprise one or more of a number of metal oxides with thermal conductivity greater than 1.5 $Wm^{-1}K^{-1}$, and Mohs hardness between about 5 and about 7, in order to provide superior wear reduction properties. The choice of which metal oxide (s) to use may be made based on a number of factors, such as cost, availability, colour, and health and safety factors, as well as the combination of thermal conductivity and Mohs hardness provided by a given metal oxide. Preferably, the metal oxide is chosen to be one or more of cerium oxide, tin oxide, titanium dioxide, or zirconium dioxide.

The metal oxide particles are preferably generally spherical in shape, and are preferably selected to have an average particle size of between 0.5 and 2 micrometers in diameter. In preferred embodiments the particles may be between 0.5 and 10 micrometers in diameter, or preferably between 0.1 and 5 micrometers in diameter, and particularly preferably between 0.5 and 2 micrometers in diameter. Particles outside these ranges may be present, but particles greater than the thickness of the desired overlay should be avoided, as they may protrude unacceptably from the overlay, and particles much smaller than 0.5 micrometer may be difficult to handle in an industrial process. For example, small particles may be pyrophoric.

The metal oxide particles may therefore have d90, or even d95 or d100, less than 6 μm or 8 μm or 10 μm or 12 μm, and d10, or even d5 or d0, greater than 0.1 μm or 0.2 μm or 0.3 μm or 0.5 μm.

According to a second aspect, the present invention may provide an overlay material for a sliding component, in which the overlay material comprises a polymeric material and a metal oxide, wherein the metal oxide has a thermal conductivity of greater than 1.5 $Wm^{-1}K^{-1}$, and a Mohs hardness of between about 5 and about 7. Preferred or advantageous features of the overlay material discussed in relation to other aspects of the invention also apply to the overlay material of the second aspect.

According to a third aspect, the invention may provide a method for forming an overlay of a sliding component, comprising the steps of mixing a polymeric material with particles of a metal oxide having a thermal conductivity of greater than about 1.5 $Wm^{-1}K^{-1}$, and a Mohs hardness of between about 5 and about 7, to form a dispersion; and depositing the dispersion onto a substrate.

Preferably, the method according to the third aspect may be a method of forming the sliding component of the first aspect of the invention, wherein the dispersion of the third aspect corresponds substantially to the material of the overlay described in relation to the first and second aspects of the invention. Preferred or advantageous features of the overlay discussed in relation to other aspects of the invention also apply to the method of the third aspect.

The metal oxide and polymeric material are preferably as described in relation to the first aspect of the invention. The polymeric material is preferably maintained in liquid state during the present method, for example by dissolution in a solvent or other process as known in the art. Following deposition onto the substrate, the dispersion is allowed to solidify, forming one or more layers of overlay on the substrate.

The method may comprise the additional step of adding a dispersant, or dispersion agent, into the mixture of polymeric material and metal oxide. Preferably the dispersant may be a polymeric dispersant, or an active polymeric dispersant, for example a polymeric alkoxylate. This may advantageously improve the dispersion of metal oxide particles within the polymeric material and prevent agglomeration of the metal oxide. This may be particularly advantageous when used with metal oxides of small particle sizes, which are prone to agglomeration. Particularly preferably, a dispersant is added to the mixture of polymeric material and metal oxide when the metal oxide has an average particle size (or d50) of 2 μm or less.

Metal oxide is preferably added to the polymeric material in a quantity that forms between 0.5 wt % and 8 wt % of the dispersion, particularly preferably between 2 wt % and 4 wt % of the dispersion. Between 0.5 wt % and 8 wt % metal oxide content has been found to provide substantial wear reduction without compromising the fatigue resistance of the sliding component, while less than 0.5 wt % exhibits poorer wear resistance, and more than 8 wt % may disadvantageously reduce the integrity of the polymer matrix and so reduce its strength.

The quantity of metal oxide dispersed in the polymeric material may also be selected in order to provide desired qualities or meet a specific demand for overlay performance.

The quantity of dispersant added to the overlay material may be chosen by reference to the quantity of metal oxide in the overlay material. Preferably, the overlay material comprises dispersant in an amount that is greater than 2 wt %, or 3 wt %, or 4 wt %, and/or less than 7 wt %, or 8 wt %, or 10 wt % of the metal oxide in the overlay material. Particularly preferably, the dispersant may be added in a quantity that is about 8 wt % of the metal oxide in the overlay material.

The method may comprise additional steps of adjusting the composition and viscosity of the mixture by adding any of: solvent, pigment material, filler material, levellers, and thinners. Preferably components that are capable of withstanding high shear stresses are added to the mixture prior to blending, and the mixture is mixed under high shear until dispersed evenly. Components not capable of withstanding high shear may then be added and mixed at a low speed until evenly dispersed in the mixture.

In one preferred embodiment of the present invention, metal oxide, and optionally dispersant, are added to pre-prepared polymeric coating, such as a commercially available PAI-based coating material.

BRIEF DESCRIPTION OF THE DRAWINGS

Specific embodiments of the invention will now be described, by way of example, with reference to the accompanying drawings in which.

DETAILED DESCRIPTION

Figure 1:
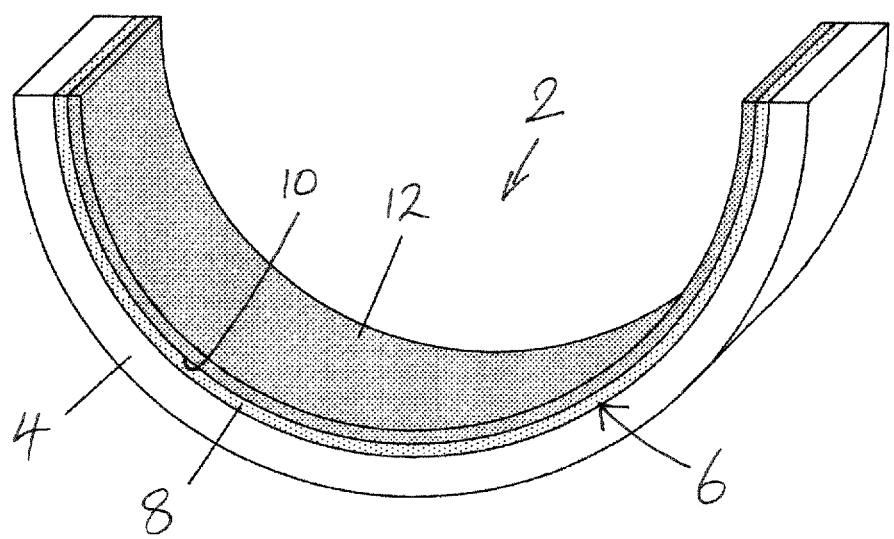
FIG. 1 is a three-quarter view of a semi-cylindrical bearing shell, incorporating an overlay embodying the invention.

FIG. 1 shows a half bearing, or semi-cylindrical bearing shell 2 for a main bearing assembly of an internal combustion engine, for retaining a cylindrical journal of a crankshaft. This half bearing comprises a semi-cylindrical bearing shell. The bearing shell has a layered construction incorporating a steel backing 4. The backing is coated with or bonded to a lining layer 6 comprising a layer 8 of copper-tin bronze and a nickel diffusion barrier, or interlayer, 10. An overlay 12 is formed by spray coating onto the interlayer.

Figure 2:
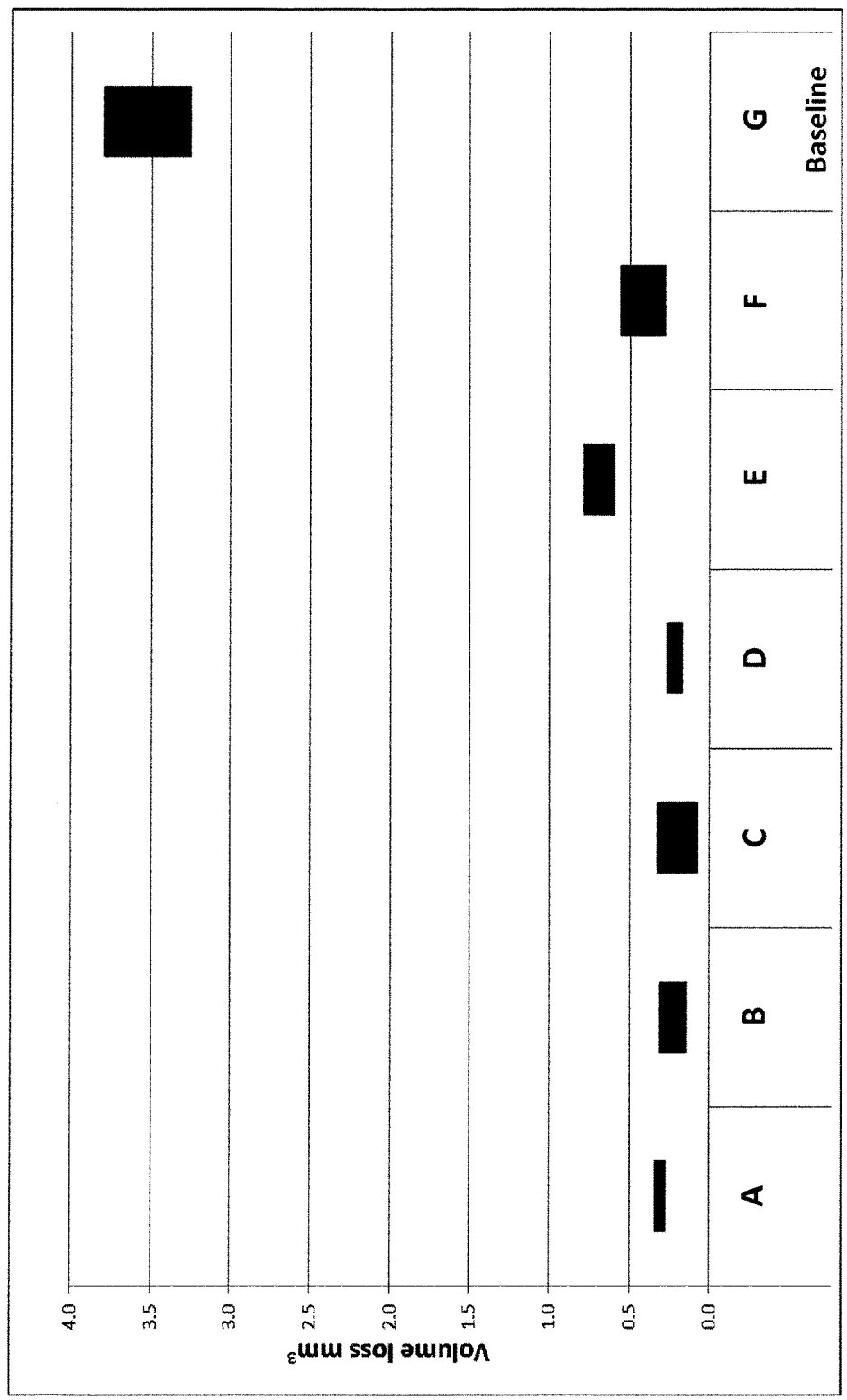
FIG. 2 is a graph showing volume loss of material (wear) in tests of seven different overlays, including six overlays embodying the invention.

The wear-test results of a number of bearings of the type shown in FIG. 1, coated in a variety of overlays embodying the present invention, are shown in FIG. 2.

According to a first embodiment, the overlay material is formed by adding polyamide imide (PAI) to a solvent together with metal oxide particles, dispersion agent and fillers, and mixing under high shear. Any fillers not capable of withstanding high shear mixing are then added with levellers and more solvent, and the mixture is mixed at a slow speed until all of the components are incorporated and evenly mixed.

Prior to application of the mixture, or dispersion, onto a substrate, the viscosity of the mixture is adjusted to spraying viscosity by adding appropriate thinners.

The skilled person will understand that a variety of solvents, fillers, levellers, and thinners are appropriate for use in the method of the present invention. For example, appropriate solvents, fillers, levellers, and thinners may include those used to form the polymer-based overlays of the prior art.

According to an alternative second embodiment of the method, the overlay material is formed by mixing together metal oxide particles, dispersant and thinner, and adding the resulting mixture to a pre-prepared PAI-based coating material. The combined mixture is then mixed together under low shear until dispersed.

Example 1: Formulation of a cerium oxide (8 wt %, 2 micron) polymer Coating

A first exemplary method of forming an overlay comprises the following steps. Polyamide imide (PAI) is added to a mixing vessel along with a first portion of N-Ethylpyrrolidone (NEP)/butyl-acetate solvent blend, together with a polymeric dispersant, micronised PTFE, and cerium oxide ($CeO_2$) particles of a 2 micron average size. The quantity of cerium oxide added is equal to about 8 wt % of the total weight of the final dispersion. A leveller and approximately 24 wt % of aluminium flake are also added. Mixing is continued until the additives are fully dispersed in the mixture to form a dispersion of overlay material.

The viscosity of the overlay material is adjusted with a blend of thinners to achieve a viscosity that is appropriate for spraying or screen-printing.

An overlay formed by this first exemplary method comprises the following materials:

| Name | Wt % to solids |
|---|---|
| Polyamide imide (PAI) | 54 |
| Cerium oxide | 8 |
| Polyethylene terephthalate (PTFE) | 9 |
| Aluminium flake | 24 |
| Other* | 5 |

*Leveller, dispersant, other fillers

Example 2: Formulation of a Tin(IV)Oxide (0.5 wt %, 0.5 Micron) Polymer Coating A second exemplary method of forming an overlay comprises the following steps.

Polyamide imide (PAI) is added to a mixing vessel along with a first portion of N-Ethylpyrrolidone (NEP)/butyl-acetate solvent blend, together with a polymeric dispersant, micronised PTFE, and tin oxide ($SnO_2$), particles of a 0.5 micron average size. The quantity of tin oxide added is equal to about 0.5 wt % of the total weight of the final dispersion. A leveller and approximately 26 wt % of aluminium flake are also added. Mixing is continued until the additives are fully dispersed in the mixture to form a dispersion of overlay material.

The viscosity of the overlay material is adjusted with a blend of thinners to achieve a viscosity that is appropriate for spraying or screen-printing.

An overlay formed by this second exemplary method comprises the following materials:

| Name | Wt % to solids |
|---|---|
| Polyamide imide (PAI) | 58 |
| Tin(IV)oxide | 0.5 |
| Polyethylene terephthalate (PTFE) | 9 |
| Aluminium flake | 26 |
| Other* | 6.5 |

*Leveller, dispersant, other fillers

The substrate is preferably pre-heated before application of the overlay material. This may help to prevent sagging of the overlay material relative to the substrate. The substrate may be pre-heated to a surface temperature of between about 30 and about 100 degrees C., preferably between about 40 and about 85 degrees C.

Optionally, before the overlay material is applied to the substrate, the overlay material may be pre-heated. The overlay material may be pre-heated to between 40 and 70 degrees, preferably between 40 and 60 degrees C. This may be done only prior to application of the first layer of the overlay material, or prior to the application of more than one, or each one, of layers of the overlay material.

Matching the temperature of the overlay material to the temperature of the substrate before application of the overlay material and/or maintaining the overlay material at a constant temperature during application of the overlay material to the substrate may help to ensure uniformity of the overlay material on the substrate. It may also help to maintain a constant viscosity of the overlay material and thereby ensure that the characteristics of the process of applying each layer of the overlay material and the resultant thickness of the applied layer of the overlay material is consistent and repeatable.

The overlay material may be applied to the substrate in one of a number of ways that will be known to the skilled person. A preferred method of applying the overlay material onto the substrate to form a sliding component embodying the present invention is to spray the overlay material in liquid form onto a substrate. The overlay material is preferably applied by a spray lance or nozzle.

After spraying of the overlay material and drying of the overlay material, the overlay material is cured. Curing hardens the polymeric material and causes cross-linking of the polymer chains. Curing gives the overlay material the desired sliding or running properties.

The improved performance of embodiments of the invention have been demonstrated by accelerated wear testing, as illustrated in FIG. 2. These tests were carried out using a test rig in which a single half bearing is arranged facing upwardly, and an electrically-driven revolving eccentric test journal is loaded downwardly into the half bearing. The eccentrically-mounted journal is offset from its axis of rotation by about 1.8 mm, to achieve 3.64 mm TIR (total indicator reading) and is nominally 6.7 mm smaller than the test-bearing bore, to generate a large clearance so that the shaft's eccentricity is accommodated within the half bearing. The bearing is lubricated by a spray bar located above the leading side of the bearing clearance. This wear test provides a repeatable set of conditions for comparing different overlays, and to ensure statistical robustness, at least six of each type of bearing is tested.

The volume loss of material in the overlay is a measurement of overlay wear.

Seven types of bearings were tested under the same conditions, termed bearings A to G in FIG. 2.

Bearing A was a bearing having an overlay formed by the second embodiment of the method described above, comprising PAI and 4 wt % of spherical $CeO_2$ particles with an average particle size (d50) of 2.554 microns, a d5 particle size of 0.889 microns, and a d95 particle size of 4.666 microns. Cerium oxide has a thermal conductivity of 12 $Wm^{-1}K^{-1}$ and a Mohs hardness of 6.

Bearing B was a bearing comprising an overlay formed by the second embodiment of the method described above, comprising PAI and 8 wt % of spherical $CeO_2$ particles with an average particle size (d50) of 2.554 microns, a d5 particle size of 0.889 microns, and a d95 particle size of 4.666 microns.

Bearing C was a bearing having an overlay formed by the second embodiment of the method described above, comprising PAI and 4 wt % of spherical $SnO_2$ particles with an average particle size of 0.5 microns. Tin oxide ($SnO_2$) has a thermal conductivity of 40 $Wm^{-1}K^{-1}$ and a Mohs hardness of approximately 6.5.

Bearing D was a bearing having an overlay formed by the second embodiment of the method described above, comprising PAI and 4 wt % of spherical $SnO_2$ particles with a d10 particle size of 0.2-0.3 microns, a d50 particle size of 0.5-0.8 microns, and a d90 particle size of 1.6-1.9 microns.

Bearing E was a bearing having an overlay formed by the first embodiment of the method described above, comprising PAI and 8 wt % of spherical $CeO_2$ particles with an average particle size (d50) of 2.554 microns, a d5 particle size of 0.889 microns, and a d95 particle size of 4.666 microns.

Bearing F was a bearing having an overlay formed by the first embodiment of the method described above, comprising PAI and 4 wt % of spherical $SnO_2$ particles with an average particle size of 0.5 microns.

Bearing G was a bearing having a PAI-based overlay according to the prior art, in which the overlay contains no metal oxide particles.

Under the same wear-test conditions, Bearing A lost approximately 0.3 $mm^3$ of the overlay material due to wear; Bearing B lost 0.25 $mm^3$; Bearing C lost 0.2 $mm^3$; Bearing D lost 0.25 $mm^3$; Bearing E lost 0.7 $mm^3$; Bearing F lost 0.4 $mm^3$; while the prior art Bearing G lost approximately 3.6 $mm^3$. All of the bearings embodying the present invention therefore displayed significantly better wear resistance than the reference bearing of the prior art.

Bearings A, B, C, and D all exhibited a more than 90% reduction in wear compared to the reference bearing, with the worst performing bearing of the invention, Bearing E, still exhibiting more than 80% reduction in wear over the reference bearing. The wear reduction exhibited by all of coatings A to F has also been found to be significantly higher than that displayed by prior art overlays comprising metal oxide particles in the form of iron oxide.

Although described herein and illustrated in the drawings in relation to a half bearing shell, the present invention may equally apply to other sliding engine components, including semi-annular, annular or circular thrust washers, and bushes, and engines comprising such sliding engine components.

The invention claimed is:

1. A sliding component comprising:
    an overlay, the overlay including:
    a polymeric material; and
    a metal oxide;
    wherein the metal oxide has a thermal conductivity of greater than 1.5 $Wm^{-1}K^{-1}$, and a Mohs hardness of between 5 and 7; and
    wherein the metal oxide is dispersed throughout the overlay in the form of particles.

2. A sliding component according to claim 1, wherein the metal oxide includes one or more of cerium oxide, tin oxide, titanium dioxide, and zirconium dioxide.

3. A sliding component according to claim 1, wherein the overlay further includes a dispersant.

4. A sliding component according to claim 1, the metal oxide in the overlay includes metal oxide particles having an average particle size of between 0.5 μm and 10 μm.

5. A sliding component according to claim 1, wherein the metal oxide in the overlay is between 0.5 wt % and 8 wt % metal oxide.

6. A sliding component according to claim 1, wherein the polymeric material is a polyamide imide (PAI).

7. A sliding component according to claim 1, wherein the overlay has a thickness between 3 μm and 12 μm.

8. A sliding component according to claim 1, wherein the metal oxide includes metal oxide particles having non-spherical shape, said metal oxide particles having an average aspect ratio of between 1:2 and 1:4.

9. A sliding component according to claim 1, wherein the metal oxide includes metal oxide particles having a spherical shape, said metal oxide particles having an average particle size of between 0.5 and 2 μm.

10. A sliding component according to claim 1, further comprising a substrate and a lining layer disposed between the substrate and the overlay, wherein the lining layer includes a copper-based material or an aluminium-based material.

11. A sliding component according to claim 1, wherein the metal oxide includes cerium oxide.

12. A sliding component according to claim 1, wherein the overlay is a multi-layered overlay including at least three distinct layers, the at least three distinct layers each having a different composition from one another.

13. A method of forming an overlay of a sliding component, comprising:
   mixing a polymeric material with particles of a metal oxide having a thermal conductivity of greater than 1.5 $Wm^{-1}K^{-1}$, and a Mohs hardness of between 5 and 7, to form a dispersion, wherein the metal oxide is added in a quantity that forms between 0.5 wt % and 8 wt % of the dispersion;
   and depositing the dispersion onto a substrate.

14. A method according to claim 13, wherein the metal oxide includes one or more of cerium oxide, tin oxide, titanium dioxide, and zirconium dioxide.

15. A method according to claim 13, further comprising adding a dispersant into a mixture of the polymeric material and the metal oxide.

16. A method according to claim 13, wherein the polymeric material includes polyamide imide (PAI).

17. A method according to claim 13, wherein depositing the dispersion includes spraying the dispersion onto the substrate.

18. A sliding component comprising:

a substrate;

a lining layer disposed on the substrate; and an overlay disposed over the lining layer, the overlay including a polyamide imide polymeric material and metal oxide particles dispersed in the polyamide imide polymeric material, wherein said metal oxide particles have a thermal conductivity of greater than 1.5 $Wm^{-1}K^{-1}$ and a Mohs hardness of between 5 and 7, wherein said metal oxide particles include spherical cerium oxide particles, wherein the metal oxide in the overlay is between 0.5 wt % and 8 wt % metal oxide.

* * * * *